(12) United States Patent
Cienski

(10) Patent No.: US 8,377,536 B2
(45) Date of Patent: Feb. 19, 2013

(54) SEAM FABRICATION METHOD AND ARTICLE MADE BY THE METHOD

(75) Inventor: Nick Cienski, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 421 days.

(21) Appl. No.: 12/709,211

(22) Filed: Feb. 19, 2010

(65) Prior Publication Data

US 2010/0215889 A1  Aug. 26, 2010

Related U.S. Application Data

(60) Provisional application No. 61/154,230, filed on Feb. 20, 2009.

(51) Int. Cl.
*B32B 3/00* (2006.01)
*B32B 37/00* (2006.01)
*B29C 65/56* (2006.01)

(52) U.S. Cl. .................................. 428/57; 36/57; 428/53

(58) Field of Classification Search .................... 428/57, 428/53; 36/57
See application file for complete search history.

(56) References Cited

U.S. PATENT DOCUMENTS

| | | | |
|---|---|---|---|
| 5,592,977 A | 1/1997 | Kikuchi et al. | |
| 6,164,093 A | 12/2000 | Seki | |
| 7,356,946 B2 | 4/2008 | Hannon et al. | |
| 7,424,783 B2 | 9/2008 | Meschter et al. | |
| 2005/0102863 A1* | 5/2005 | Hannon et al. | 36/57 |

* cited by examiner

*Primary Examiner* — Brent O'Hern
(74) *Attorney, Agent, or Firm* — Oblon, Spivak, McClelland, Maier & Neustadt, L.L.P.

(57) ABSTRACT

A method of joining laminate panels includes providing at least two laminate panels and joining together the seam areas of the at least two laminate panels by forming at least one seam. Each laminate panel includes at least one layer of textile material having a first thickness in a non-seam area and a second thickness in a seam area. The second thickness is less than the first thickness. An article of manufacture includes at least two laminate panels joined together at the seam areas of the at least two laminate panels by forming at least one seam. Each laminate panel includes at least one layer of textile material having a first thickness in a non-seam area and a second thickness in a seam area.

9 Claims, 5 Drawing Sheets

SEAM FABRICATION METHOD AND ARTICLE MADE BY THE METHOD

CROSS-REFERENCE TO RELATED APPLICATIONS

This application is based upon and claims the benefit of priority under 35 U.S.C. §119(e) to U.S. Provisional Application No. 61/154,230, filed on Feb. 20, 2009. The entire contents of this application is incorporated herein by reference.

BACKGROUND OF THE INVENTION

1. Field of the Invention

This invention relates to the production of apparel created from laminates, including those having a complex textile structure on the sealing side of the laminate, where the seams are in a seam region of a textile woven with a thinner thickness than a non-seam region. The invention also relates to articles made according to such a production method. In one embodiment, the seams are waterproof.

2. Description of the Background Art

The use of coated textile composites or laminates of textiles and liquid protective barrier membrane layers to create apparel is known in the industry. The most common of these applications is waterproof breathable apparel. Coated textiles can also be used in textile composites for these same purposes. Coated textiles, protective barrier membranes, and protective barrier films will be collectively referred to hereafter as "laminates" solely for convenience of description.

Pieces or panels of these laminates are joined together to form garments and other similar textile structures. For the garments to be liquidproof and protective, there is a need to seal the seams where the panels of laminate are joined together. The joining of these laminate panels is typically done by first sewing the laminates together using conventional sewing techniques. Liquidproof sealing of these sewn seams is then accomplished by the application of a seam seal tape having a thermoplastic hot melt adhesive which seals to the surface of the coating or protective barrier film and creates a seal over the sewing holes and the area where the layers join between the stitches. The seam seal tape may be heated, for example, using a nozzle to direct a stream of hot air so as to melt the adhesive. The tape is then applied over the seam and both are passed through the nip of a pair of pressure rollers in order to squeeze the molten adhesive onto the protective layer surface to ensure good bonding of the tape to the surface. For aesthetic reasons, the seam sealing tape is generally applied to the interior of a garment so that it is hidden from view. Less common sealing techniques such as gluing and welding are also known in the art.

The use of textile constructions with three layers, and possibly even more layers in some instances, creates added difficulty in forming a liquidproof seam. Not only does a seal need to reach the protective barrier layer surface, but also the structure of the textile itself needs to be sealed or encapsulated to prevent liquid from wicking or seeping along the textile fibers and exiting beyond the boundary of the liquidproof seam. Thus, the seam sealing of such three-layer fabrics, such as those having a complex textile structure for the inner lining layer, has posed significant problems in the art.

One background art solution is shown in FIGS. 1-4. FIG. 1 shows a triple laminate material 10 including a complex textile layer 12 on the sealing side 18, a barrier layer 14 and a second textile layer 16, which may or may not comprise a complex textile. FIG. 2 shows the textile laminate panel of FIG. 1 with a portion of the complex textile layer 12 completely removed by skiving to reveal sealing region 20. Two or more textile laminate panels are then joined at their respective sealing regions 20 to form a liquidproof seam as shown in FIGS. 3 and 4. However, this solution creates additional problems and complexities.

In another background art example, FIG. 5 shows a two layer laminate panel 30A with a complex textile layer 12 having a portion removed by skiving and a barrier layer 14 joined to a two layer laminate panel 30B. An adhesive 32 joins the skived areas of the two panels together. The sealed region is folded over and a second adhesive 34 holds the folded portion to the surface of the joined laminate panel structure.

Initially, the present inventors realized that adding a skiving step creates additional expense as skiving machines would be needed to create garments with this type of seam. Further, by skiving off all of textile layer 20, the background art solution creates the possibility that layer 12 may peel off of layer 14 during use. For example, as shown in FIGS. 3 and 4, layer 12 does not extend to stitches 22, and thus may peel back from layer 14 during use. Thus, the present inventors saw the need to keep at least some of layer 12 across the entire surface of the material, and to eliminate the need for skiving machines.

SUMMARY OF THE INVENTION

A method of joining laminate panels includes providing at least two laminate panels and joining together the seam areas of the at least two laminate panels by forming at least one seam. Each laminate panel includes at least one layer of textile material having a first thickness in a non-seam area and a second thickness in a seam area. The second thickness is less than the first thickness.

An article of manufacture includes at least two laminate panels joined together at the seam areas of the at least two laminate panels by forming at least one seam. Each laminate panel includes at least one layer of textile material having a uniform first thickness in a non-seam area and a uniform second thickness in a seam area. The uniform second thickness is less than the uniform first thickness.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
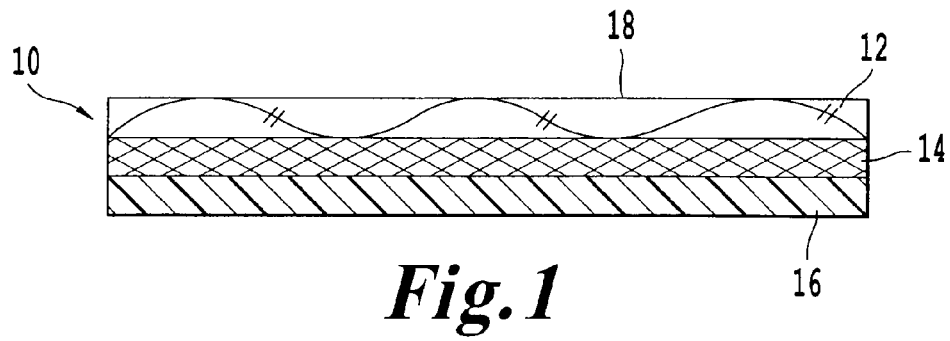
FIG. 1 shows a cross sectional view of a three layer laminate of the background art before skiving.
Figure 2:
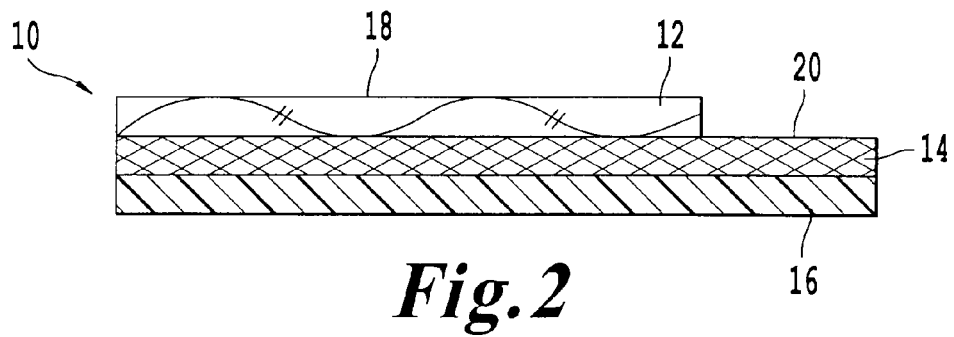
FIG. 2 shows a cross sectional view of a three layer laminate of the background art that has been skived, prior to sewing or sealing.
Figure 3:
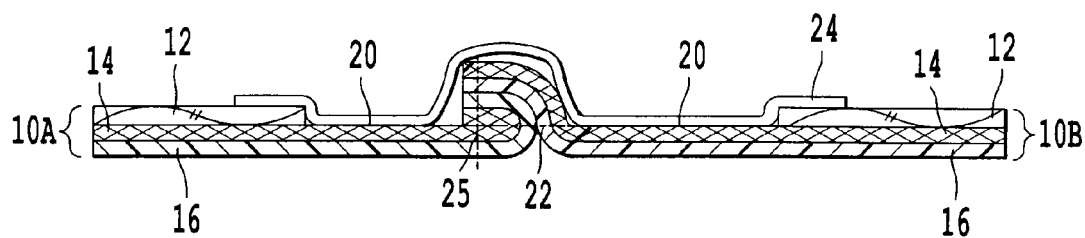
FIG. 3 shows a cross sectional view of a background art top-stitched simple seam configuration between three layer laminate panels.
Figure 4:
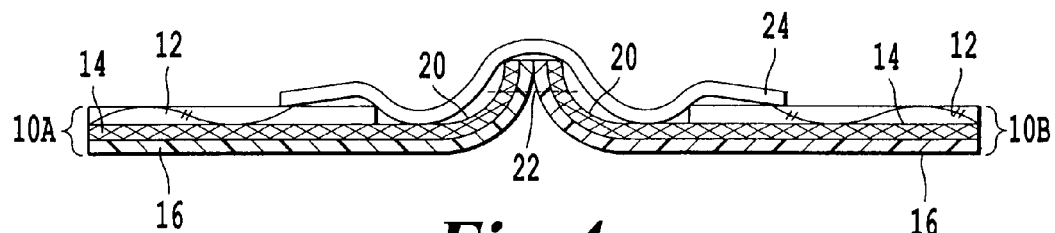
FIG. 4 shows a cross sectional view of another embodiment of a background art simple seam configuration between three layer laminate panels.
Figure 5:
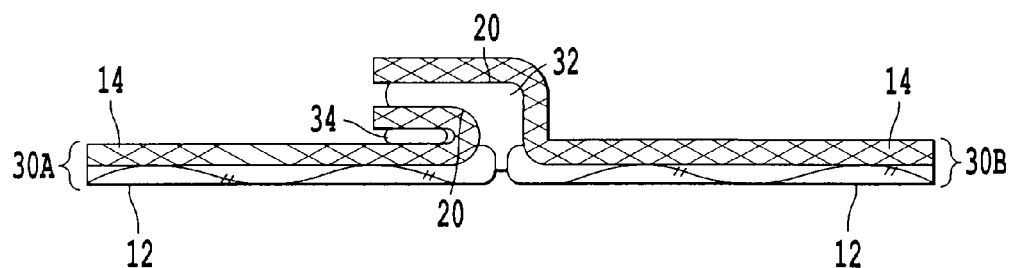
FIG. 5 shows a cross sectional view of a background art top-stitched simple seam between four layer laminate panels.

Referring now to the drawings, wherein like reference numerals designate identical or corresponding parts throughout the several views.

Figure 6:
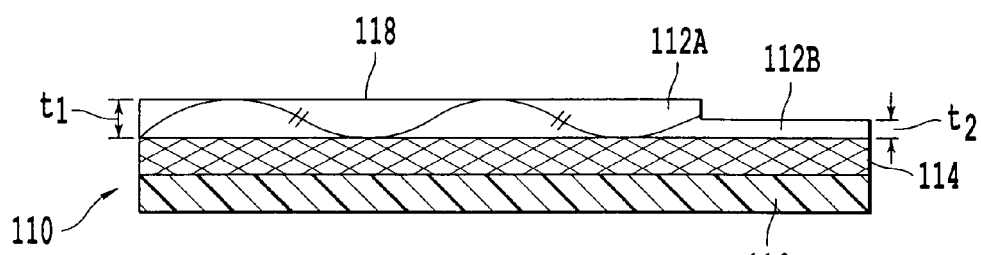
FIG. 6 shows a cross sectional view of a three layer laminate according to one embodiment of the present invention.

FIG. 6 shows a cross-sectional view of a three layer textile laminate panel 110 having a sealing side 118 for joining the laminate panel to another laminate panel (not shown) in accordance with an embodiment of the present invention. The laminate panel 110 includes a continuous textile layer including first portion 112A in a non-seam area and second portion 112B in a seam area on the sealing side 118 of laminate panel 110. The laminate panel 110 also includes a barrier layer 114 and a second textile layer 116. Second textile layer 116 may be knit or woven, and it is not necessarily waterproof.

The barrier layer 114 of the laminate may be a protective membrane, film or coating. It may be selected from the group of materials including, but not limited to, polyesters, polyamides, polyketones, polysulphones, polycarbonates, fluoropolymers, polyacrylates, co-polyether esters, co-polyether amides, polyurethanes, polyvinylchloride, polytetrafluoroethylene or polyolefins. For waterproof breathable applications the first layer may be formed from expanded polytetrafluoroethylene (ePTFE). Expanded polytetrafluoroethylene is known to be very waterproof and highly breathable. The ePTFE may be provided with a coating of a hydrophilic polymer in known manner. Such laminates may provide a water-vapor transmission rate of greater than 1500 g/m$^2$/day (particularly greater than 3000 g/m$^2$/day) and a water entry pressure of greater than 0.07 bar for a period of at least three minutes. For chemical protective application, laminates may incorporate impermeable or selectively permeable layers.

The continuous textile layer is knit such that first portion 112A has a thickness $t_1$ and second portion 112B has a thickness $t_2$, where $t_2$ is less than $t_1$. In one embodiment, this can be done using a jacquard knit machine. The thicknesses of the different portions are then knapped (brushed to increase the loft of the higher portion). In another embodiment, a uniform pile can be knitted and then the thickness differences can be created using a laser. Using a laser may allow for greater differences in thickness between different portions. In one embodiment, $t_2$ is 3 mm and $t_1$ is 5 mm. In one embodiment, the difference between $t_2$ and $t_1$ is at least 1 mm. In other embodiments, the differences between $t_2$ and $t_1$ are: at least 3 mm, at least 5 mm, at least 7 mm, and at least 9 mm. Further, in the embodiment where $t_2$ is 3 mm and $t_1$ is 5 mm, a ratio of $t_2/t_1$ is 0.6. In other embodiments, a ratio of $t_2/t_1$ may be 0.7, 0.8, 0.9, or more.

Figure 15:
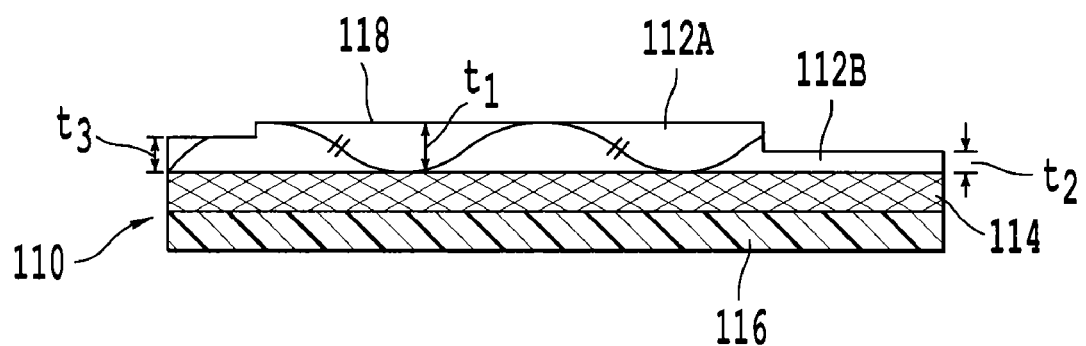
FIG. 15 shows an embodiment of the invention including a continuous textile layer knit such that it includes portions with three different uniform thicknesses.

It is also noted that different portions of the continuous textile layer in the non-seam area can have different thicknesses, as long as the thickness in the seam area is lower. In one embodiment, a minimum thickness of $t_2$=3 mm is desired. Although FIG. 6 shows that the continuous textile layer includes portions with two different uniform thicknesses, in another embodiment of the present invention, the continuous textile layer may be knit such that it includes portions with three or more different uniform thicknesses $t_1$, $t_2$ and $t_3$, as shown in FIG. 15.

Further, by knitting or weaving the continuous textile layer as described above, a uniform thickness $t_1$ can be created in first portion 112A and a uniform a thickness $t_2$ can be created in second portion 112B. Accordingly, a more uniform seam can be formed when making an article of manufacture including laminate panels as described above. In comparison, the conventional art method of skiving away a portion of the textile layer will not necessarily result in uniform thicknesses in the seam area and the non-seam area of the textile layer. Thus, less reliable seams may result from the conventional art process.

The continuous textile layer may have a fiber, or filament, structure (whether mono-filament or multi-filament) having a tortuous path through which liquid adhesives have limited ability to penetrate to the protective barrier layer and to encapsulate the filaments of the textile layer in order to form a liquidproof seam. Textile structures can include, for example, wovens or knits which are brushed, fleeced, or otherwise knapped (i.e., any suitable raised surface) forms thereof.

Figure 7:
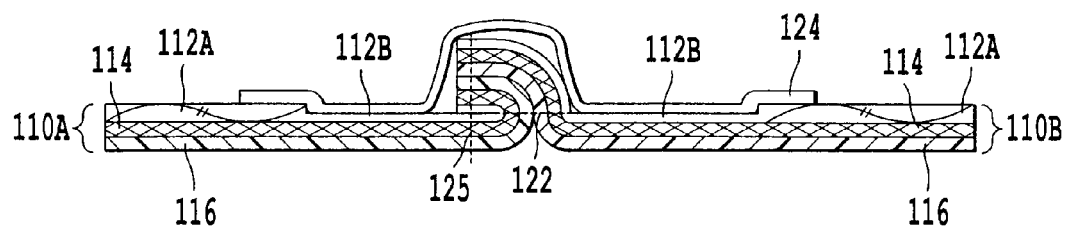
FIG. 7 shows a cross sectional view of a top-stitched simple seam configuration between three layer laminate panels formed in accordance with one embodiment of the present invention.

Two or more textile laminate panels are then joined as shown in cross-section in FIG. 7. Particularly, in the embodiment shown, the two laminate panels 110A and 110B are sewn together with stitches 122 joining the laminate panels together and stitches 125 holding down, or "top-stitching," the seam allowance between the stitches 122 and the edges of the panels 110A and 110B. Seam sealing tape 124 covers and adheres to the joined panel edges and the seam area 112B and extends and adheres onto a portion of the non-seam area 112A beyond the seam area 112A. With this construction, a durably liquidproof seam can be created where the seam tape 124 is anchored to the textile through the thinner seam area 112B. This thinner seam area 112B is thin enough to allow adhesive to penetrate therethrough. Further, since the textile extends to both stitches 122 and 125, the textile should not peel away from the barrier layer 114.

In the embodiment shown in FIG. 7, seam sealing tape 124 is used to create a liquidproof seam. However, in other embodiments of the present invention, seam sealing tape 124 is omitted. In this case, the seam is not necessarily waterproof. Such a non-waterproof seam may be used for an internal seam of a garment, or it may be used in a garment that does not need to be waterproof. A non-waterproof seam made in accordance with the present invention will have seams that are less bulky due to the relatively thinner seam area 112B.

Figure 8:
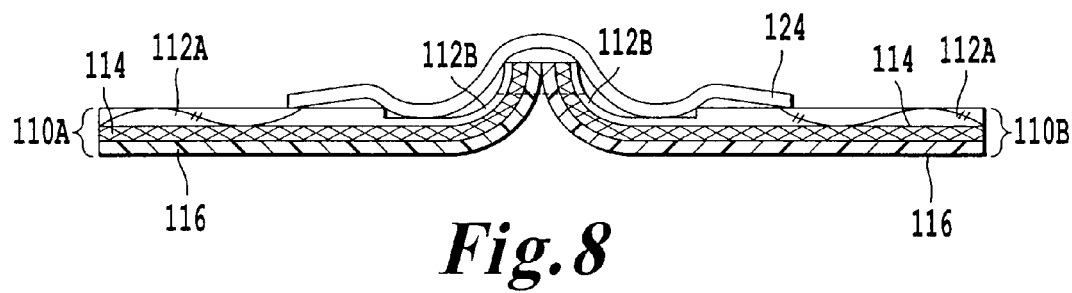
FIG. 8 shows a cross sectional view of another embodiment of a simple seam configuration between three layer laminate panels formed in accordance with the present invention.

An alternative construction of a durably liquidproof taped seam is shown in FIG. 8, wherein rather than a top-stitched seam, a simple single-stitched seam is incorporated. During the seam taping step, the seam allowance beyond stitches 122 may fall to either panel side, and the seam tape 124 is provided to be sufficiently wide that the seam tape will adhere to both the seam area 112B and a portion of the non-seam area 112A beyond the seam area 112A.

Figure 9:
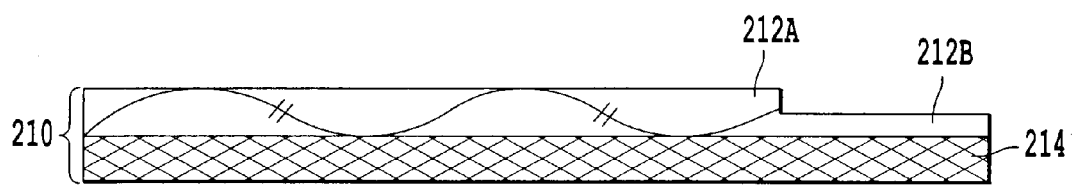
FIG. 9 shows a cross sectional view of a two layer laminate panel according to a second embodiment of the present invention.
Figure 10:
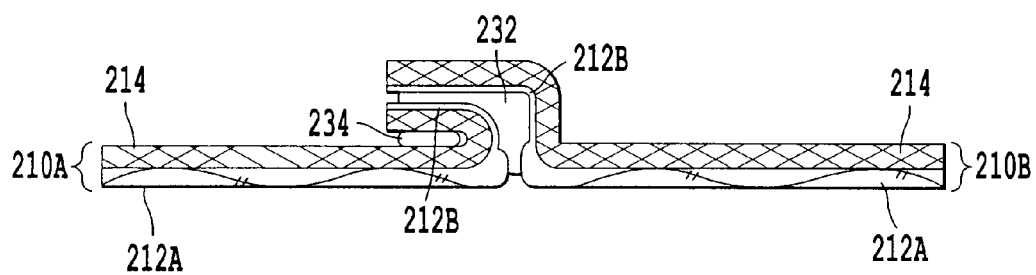
FIG. 10 shows a cross sectional view of a top-stitched simple seam between four layer laminate panels formed in accordance with a second embodiment of the present invention.

FIGS. 9 and 10 show an alternative embodiment of a two layer construction suitable for creating a liquidproof seal of one embodiment of the present invention. Specifically, FIG. 9 shows a two layer laminate panel 210 with a continuous textile layer including first portion 212A in a non-seam area and second portion 212B in a seam area of laminate panel 210. The thickness of first portion 212A is thicker than the thickness of second portion 212B. Laminate panel 210 also includes a barrier layer 214. FIG. 10 shows in cross-section two laminate panels 230A and 230B joined together according to one embodiment of the present invention. In this embodiment, an adhesive 232 joins the seam areas 212B of the two panels together, then the sealed region is folded over and a second adhesive 234 holds the folded portion to the surface of the joined laminate panel structure.

Figure 11:
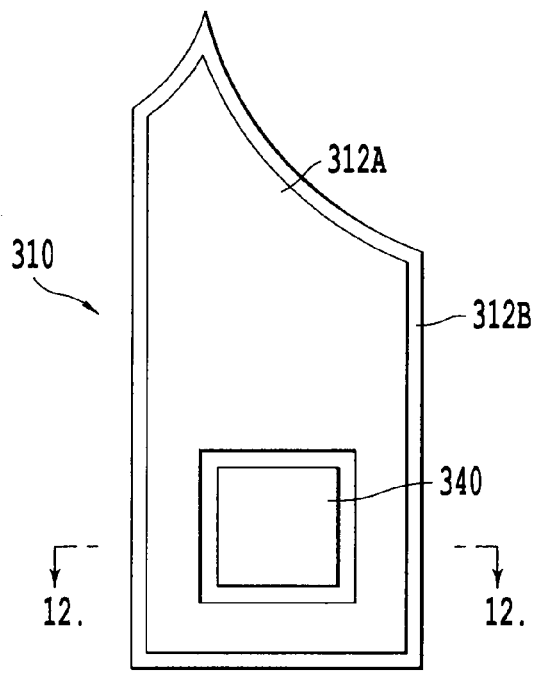
FIG. 11 shows a top view of a laminate panel in the form of a front panel of a jacket formed in accordance with one embodiment of the present invention.
Figure 12:
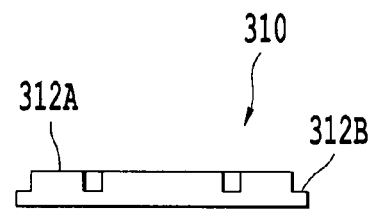
FIG. 12 shows a cross-sectional view of the laminate panel shown in FIG. 11.

FIG. 11 is a view of a three layer laminate panel 310 for a front panel of a jacket including a continuous textile layer including first portion 312A in a non-seam area and second portion 312B in a seam area of laminate panel 310. FIG. 12 is a cross-sectional view of the laminate panel 310 of FIG. 11 showing that a thickness of seam area 312B is less than the thickness of non-seam area 312A.

Figure 13:
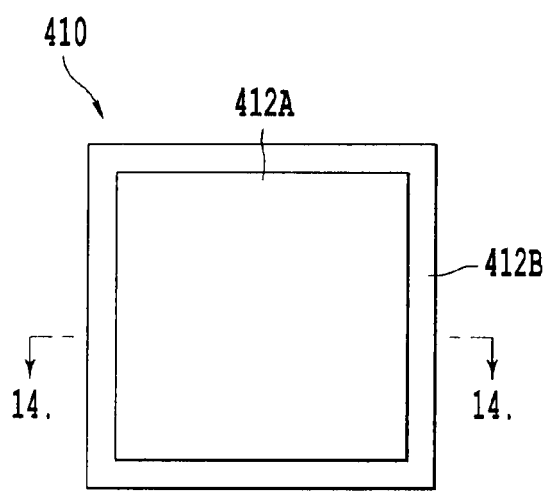
FIG. 13 shows a top view of a laminate panel in the form of a rectangular pocket formed in accordance with one embodiment present invention.
Figure 14:
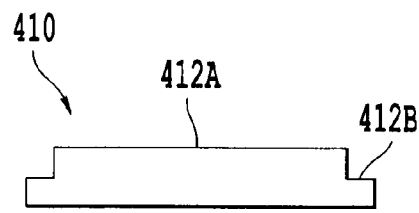
FIG. 14 shows a cross-sectional view of the laminate panel shown in FIG. 13.

FIG. 13 is a view of a laminate panel 410 which in this embodiment is in the form of a substantially rectangular pocket for the jacket panel 310 shown in FIG. 11. Laminate panel 410 includes a continuous textile layer including first portion 412A in a non-seam area and second portion 412B in a seam area of laminate panel 410. FIG. 14 is a cross-sectional view of the laminate panel 410 of FIG. 13 showing that a thickness of seam area 412B is less than the thickness of non-seam area 412A. Laminate panel 410 is then connected to laminate panel 310 by connecting the seam portions 412B and 312B, respectively.

Obviously, numerous modifications and variations of the present invention are possible in light of the above teachings. It is therefore to be understood that within the scope of the appended claims, the invention may be practiced otherwise than as specifically described herein.

The invention claimed is:

1. An article of manufacture comprising:
    at least two laminate panels, each laminate panel including at least one layer of textile material having a uniform first thickness in a non-seam area and a uniform second thickness in a seam area where the at least two laminate panels overlap, said uniform second thickness being less than said uniform first thickness, the at least one layer of textile material being continuously woven to have the uniform first thickness in the non-seam area and the uniform second thickness in the seam area; and
    at least one seam joining together the seam areas of the at least two laminate panels.

2. The article of manufacture according to claim 1, wherein the at least one layer of textile material is knapped to increase a loft of material in the non-seam area.

3. The article of manufacture according to claim 1, wherein the uniform first thickness is about 5 mm and the uniform second thickness is about 3 mm.

4. The article of manufacture according to claim 1, wherein a ratio of the uniform second thickness to the uniform first thickness is about 0.6 or more.

5. The article of manufacture according to claim 1, wherein the uniform first thickness is at least 1 mm greater than the uniform second thickness.

6. The article of manufacture according to claim 1, wherein a water resistant barrier layer is joined to the at least one layer of textile material of each laminate panel.

7. The article of manufacture according to claim 1, wherein the at least one seam is a waterproof seam.

8. An article of manufacture comprising:
    at least two laminate panels, each laminate panel including at least one layer of textile material having a uniform first thickness in a non-seam area and a uniform second thickness in a seam area where the at least two laminate panels overlap, said uniform second thickness being less than said uniform first thickness, the at least one layer of textile material being continuously knitted to have the uniform first thickness in the non-seam area and the uniform second thickness in the seam area; and
    at least one seam joining together the seam areas of the at least two laminate panels.

9. The article of manufacture according to claim 8, wherein the at least one layer of textile material is continuously knitted to have the uniform first thickness in a first non-seam area, the uniform second thickness in the seam area, and a uniform third thickness in a second non-seam area, the uniform second thickness being less than the uniform third thickness.

* * * * *